No. 894,052. PATENTED JULY 21, 1908.
R. RADTKE.
SAFETY DEVICE FOR OCCUPANTS OF VEHICLES.
APPLICATION FILED MAR. 16, 1908.
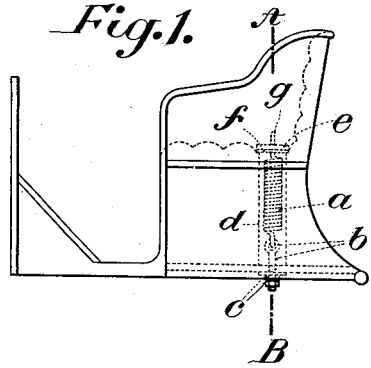
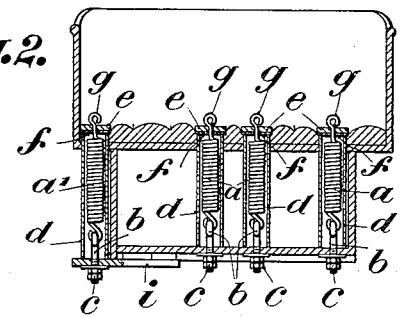
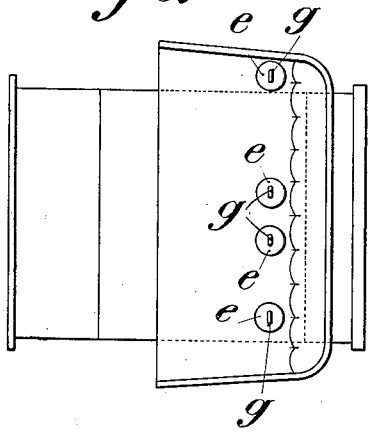
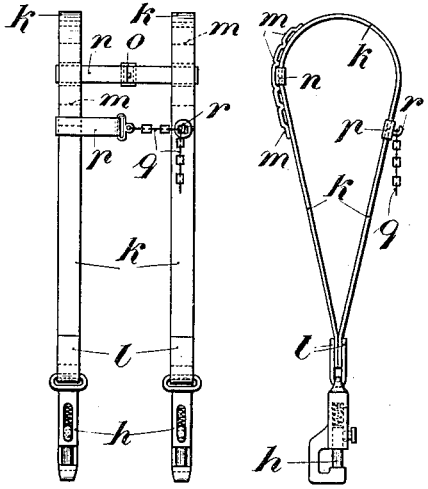
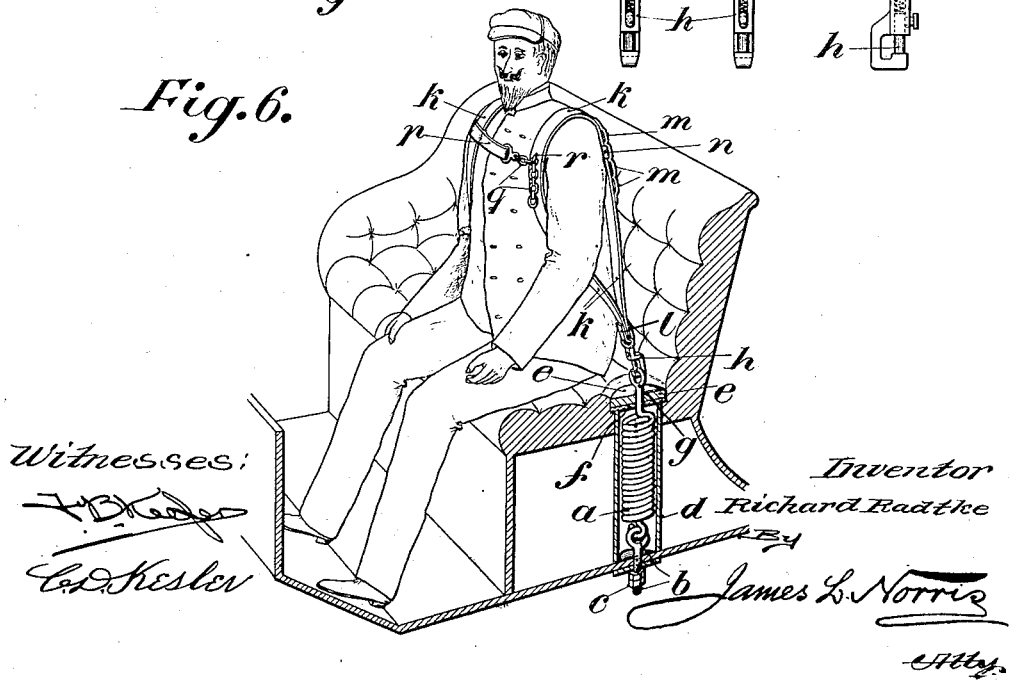

UNITED STATES PATENT OFFICE.

RICHARD RADTKE, OF SUHL, GERMANY.

SAFETY DEVICE FOR OCCUPANTS OF VEHICLES.

No. 894,052.      Specification of Letters Patent.      Patented July 21, 1908.

Application filed March 16, 1908. Serial No. 421,526.

*To all whom it may concern:*

Be it known that I, RICHARD RADTKE, royal forestry steward, subject of the German Emperor, residing at Suhl, Kingdom of Prussia, German Empire, have invented certain new and useful Improvements in or Relating to Safety Devices for the Use of Occupants of Vehicles, of which the following is a specification.
My invention relates to a safety device for the occupants of vehicles, the object of which is to prevent such occupants of a motor vehicle for example from being thrown upwards and forwards in the case of a sudden shock, owing to the momentum of the car or their own weight and thus injured by falling head downwards.

The action of the device is such that it does not in any way interfere with the free movements of the person using the same such as the driver and when the vehicle experiences a sudden shock the driver or other occupant is elastically held at the shoulders in such manner that he is slightly thrown upwards and forwards, but after the absorption of the momentum of the body, pulled back again in a springy manner to his seat. In that way he is protected from injury in case of such accidents.
According to this invention, the protecting device consists of two rubber holders or bands which are elastic in themselves, and which are placed round the body of the person in such manner that they rest securely on the shoulders and are connected together by means of a back strap and of an easily detachable breast strap, that is to say they cannot fall off from the shoulders, and nevertheless insure an ease of movement of the wearer;
and of two vertically expanding springs secured to or at the seat and connected to the rubber holders by means of easily detachable hooks. In the case of a sudden shock to the vehicle, the rubber holders and the springs expand, absorb the momentum and pull the wearer back to the seat with a vertical pull. In order that the wearer should not always be tied to the seat of the car by the protective device, but in case of necessity or otherwise when leaving the vehicle, should be able to detach the said protective device from the seat, the holders or bands are secured to the springs in the seat by means of easily detachable spring hooks, and on the other hand, the breast strap is rendered easily detachable by means of hooks and chain so that the wearer can at once pull off the device.

The safety device according to this invention is illustrated by way of example in the accompanying drawing.
Figure 1 shows the springs in the seat in side elevation, Fig. 2 is a longitudinal section on line A—B, Fig. 3 a plan, Figs. 4 and 5 are respectively front and side elevations of the elastic rubber holders, and Fig. 6 shows the method of putting on the protective device in perspective.

The helical springs $a$ are mounted in the seat of the vehicle and provided with eyes at the top and at the bottom. With the bottom eye engages a screw bolt $b$ passing through the bottom of the seat and secured there by means of a nut $c$ with a metal washer. The springs $a$ are surrounded by metal sleeves $d$ which are closed at the top by means of a cover $e$ secured below the upper eye to the spring. The cover is provided at the bottom face with a leather or rubber plate $f$ for the purpose of avoiding noise in driving. The springs $a$ could be arranged, if the space in the seat box is insufficient, outside the same as shown for the spring $a'$. In that case there is arranged under the bottom board a metal plate $i$ projecting outwards to which is secured the bolt $b$. With the upper eyes $g$ of the springs $a$ engage the hooks $h$ of the rubber holders or bands $k$, Figs. 4 and 5. The rubber holders or bands $k$ pass over the shoulders and are connected together at the bottom ends by means of a leather cap $l$ to which is secured the hook $h$.

By means of a device which will be now described, the rubber bands or bolts are arranged in such manner that they rest firmly on the shoulders and in spite of that, can be easily stripped off.

To the rubber belts or straps $k$ are sewed from the shoulders downwards straps $m$ which form loops. Through the loops $m$ is drawn the back transverse strap $n$ the ends of which can be brought nearer together or further apart, according to the size of the waist of the wearer. Owing to the arrangement of the loops $m$ the back connecting part $n$ can be secured at a higher or lower level according to the height of the wearer. On the front side the two rubber holders or bands $k$ are connected together by the belt $p$, sewed onto the right holder or band and provided at its free end with a chain $q$ which can be connected to a hook r which is arranged on the left hand holder or band and is open downwards and upwards. By means of the hooks r h, the rubber belts or straps can be easily detached.

Owing to rubber straps being used for holding the body, the straps are prevented from pressing too hard thereon in case of an accident. Owing to these rubber straps k and the springs a, the pull which brings back the wearer, is an elastic one.

What I claim is:

A safety device for the occupants of vehicles comprising in combination a plurality of rubber straps forming a closed belt, held on the shoulders in an easily detachable manner by loops and back straps provided with a buckle, as well as of a breast band attached at one side and connected at the other side by means of hooks and chain in an easily detachable manner, two vertical helical springs being arranged on the seat, to the upper eyes of which the rubber straps are attached by means of easily opened spring hooks so that the springs and the rubber straps exercise an elastic vertical pull on the body of the wearer when it is thrown upwards and forwards by the vehicle striking an obstacle, in such manner that the said wearer is pulled back to the seat.

In testimony whereof I have hereunto set my hand in presence of two subscribing witnesses.

RICHARD RADTKE.

Witnesses:
 FRANZ STROM,
 ERICH BERNHARDT.